United States Patent
Lyle et al.

(10) Patent No.: US 7,647,296 B2
(45) Date of Patent: Jan. 12, 2010

(54) METHOD FOR ESTIMATING A FIRST ACCESS TIME OF TRANSACTIONS ACCESSING A DATABASE OBJECT

(75) Inventors: Robert W. Lyle, Morgan Hill, CA (US); Michael J. Winer, Markham (CA)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 11/376,937

(22) Filed: Mar. 15, 2006

(65) Prior Publication Data

US 2007/0219998 A1 Sep. 20, 2007

(51) Int. Cl.
G06F 7/00 (2006.01)
G06F 17/30 (2006.01)

(52) U.S. Cl. ............................................. 707/2; 707/8
(58) Field of Classification Search ........................ None
See application file for complete search history.

(56) References Cited

U.S. PATENT DOCUMENTS

| | | | | |
|---|---|---|---|---|
| 4,412,285 | A | * | 10/1983 | Neches et al. ............... 709/252 |
| 6,240,413 | B1 | * | 5/2001 | Learmont ...................... 707/8 |
| 6,460,055 | B1 | * | 10/2002 | Midgley et al. ............. 707/204 |
| 6,694,340 | B1 | | 2/2004 | Lyle et al. |

OTHER PUBLICATIONS

Mohan, Commit_LSN: A Novel and Simple Method for Reducing Locking and Latching in Transaction Processing Systems, Aug. 1990, Proceedings of the 16th VLDB Conference, pp. 406-418.*
C. Mohan, "*Commit_LSN: A Novel and Simple Method for Reducing Locking and Latching in Transaction Processing Systems*", Proceedings of the 16th VLDB Conference, Brisbane, Australia, Aug. 1990, pp. 406-418.

* cited by examiner

*Primary Examiner*—Pierre M Vital
*Assistant Examiner*—Jason Liao
(74) *Attorney, Agent, or Firm*—Sawyer Law Group, P.C.

(57) ABSTRACT

A method for estimating the first access time of a plurality of currently active transactions accessing at least one database object are disclosed. In one aspect, the method may include providing a storage area of a particular size to store data for a plurality of groups corresponding to the at least one database object. Each of the plurality of groups corresponds to a particular time interval. The method includes placing each of the currently active transactions in a group of the plurality of groups based upon a time of a first access of the at least one database object by each of the currently active transactions and the particular time interval. The method also includes storing a group first access time for the group. The group first access time corresponds to the earliest first access time for any of the currently active transactions in the group. The method may also include defining the object's first, or earliest access time, to be the earliest group first access time for currently active groups.

24 Claims, 4 Drawing Sheets

METHOD FOR ESTIMATING A FIRST ACCESS TIME OF TRANSACTIONS ACCESSING A DATABASE OBJECT

FIELD OF THE INVENTION

The present invention relates to database management systems and more particularly to a method and system for estimating the earliest, or first access time for all currently active transactions accessing a database object.

BACKGROUND OF THE INVENTION

In a database system, the earliest point in time at which any currently active transaction first accessed a database object for read or write access may be desired to be tracked for a variety of reasons. For example, the earliest first write access time for any currently active transaction for an object, such as a table, table space, or object therein, may be used to determine whether certain data is committed or is not yet committed. Similarly, the time at which the earliest first read access by any currently active transaction on an object was made may be used to determine if deleted data on the database system is no longer needed. If the data is not needed, the data may be removed such as to be unrestorable. Consequently, using the earliest read and write access times for all currently active transaction accessing an object is valuable in managing locking and performing space management.

In order to track the earliest access times for the set of all currently active transactions, conventional tracking methods may utilize a log sequence number. The log sequence number is the current position of the database system's log write cursor. A commit LSN (CLSN) is a particular LSN that corresponds to a particular point in time that is at least as old as the earliest access time to a database object or system for the set of all currently active transactions. A particular CLSN value corresponds to a particular time and, therefore, may be considered to be representative of that time. The CLSN values were initially used for tracking write transactions. However, conventional methods of tracking the initial access times currently use the LSN values to determine the first point in time that any currently active transaction accessed a database object for read and/or write access.

Conventional database systems track the CLSN values in a number of ways. Certain conventional systems maintain the CLSN values at a system level. For example, a single CLSN value may be tracked for all objects within a database system. Although tracking the CLSN values at a system level is possible, one of ordinary skill in the art will readily recognize that CLSN values maintained in such a conventional manner are prone to becoming stale. For example, a single transaction that runs for days may result in a stale CLSN value that is quite old in comparison to remaining transactions accessing a different database object. Consequently, processes that use this stale CLSN value may be less effective in performing their functions. In space management, for example, data that will not be used by existing transactions may be less likely to be removed. Consequently, if a conventional method that tracks CLSN values at the system level is used, a single long-running transaction may adversely affect performance of the entire database system. Moreover, a particular transaction accessing a particular database object may also affect other transactions, including those which do not access the same database object. This result of including system-level tracking is also undesirable.

Another conventional method may maintain CLSN values for each database object. In such conventional systems a conventional linked list may be associated with each object. The conventional linked list includes information about all currently active read and write transactions accessing the database object. Consequently, the CLSN values for each object in the database system may be accurately maintained.

Although conventional methods that maintain CLSN values using linked lists for each object may not suffer from stale CLSN values, other drawbacks persist. In particular, these linked list-based methods for maintaining the conventional CLSN values for each object on the database system may consume substantial resources. Because such conventional methods may have high overhead, such conventional methods may have a significant adverse impact on performance of the conventional databases system.

Accordingly, what is needed is a more efficient method and system for tracking the earliest first access time for the set of all currently active transactions in a database system accessing an individual object. The present invention addresses such a need.

BRIEF SUMMARY OF THE INVENTION

The present invention provides a method, computer program product, and system for estimating the earliest first access time for a plurality of currently active transactions accessing a database object. In one aspect, the method may comprise providing a storage area of a particular size to store data for a plurality of groups corresponding to each of the at least one database object. Each of the plurality of groups corresponds to a particular time interval. The method comprises placing each of the currently active transactions in a group of the plurality of groups based upon a time of a first access of the database object by that transaction and the particular time interval. The method also comprises storing a group first access time for the group. The group first access time corresponds to the earliest first access time for any of the currently active transactions in the group.

According to the method, computer program product, and system disclosed herein, the present invention may provide an efficient mechanism for tracking the earliest first access time of the set of all currently active transactions accessing an object in a database system.

DETAILED DESCRIPTION OF THE INVENTION

The present invention relates to database systems. The following description is presented to enable one of ordinary skill in the art to make and use the invention and is provided in the context of a patent application and its requirements.

Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The present invention provides a method, computer program product, and system for efficiently determining an earliest first access time of a plurality of currently active transactions accessing at least one database object. In one aspect, the method comprises providing a storage area of a particular size to store data for a plurality of groups corresponding to the at least one database object. Each of the plurality of groups corresponds to a particular time interval. The method comprises placing each of the currently active transactions in a group of the plurality of groups based upon a time of a first access of the at least one database object by that transaction and the particular time interval. The method also comprises storing a group first access time for the group. The group first access time corresponds to the earliest first access time for any of the currently active transactions in the group.

The present invention is described in the context of particular methods and database systems. However, one of ordinary skill in the art will readily recognize that other database systems and other methods having other and/or additional steps consistent with the present invention could be used. The present invention is described in the context of LSN values. However, one of ordinary skill in the art will readily recognize that the other values corresponding to time and from which an age can be determined might be used. Examples of such values include but are not limited to a clock value or a counter value that monotonically increases.

Figure 1:
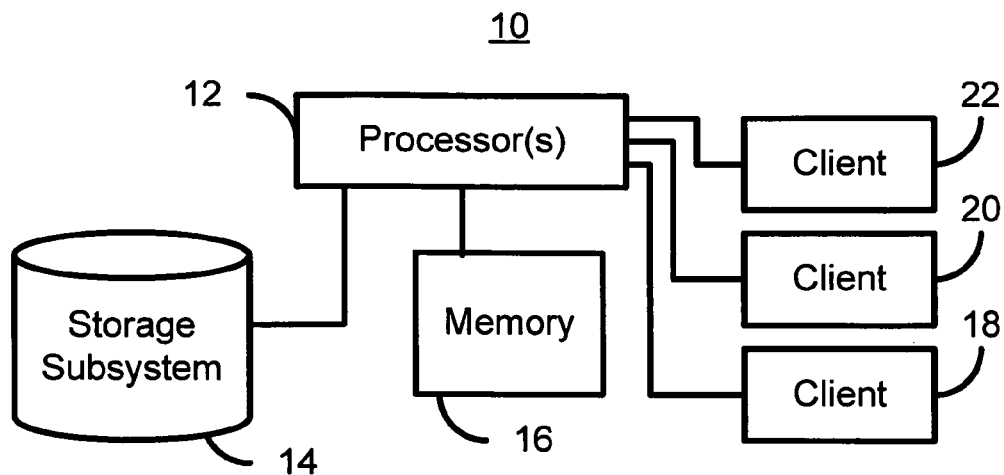
FIG. 1 is a diagram depicting one embodiment of a data processing system used in conjunction with the method and system in accordance with the present invention.

To more particularly describe the present invention, refer to FIG. 1 depicting one embodiment of a data processing system 10 used in conjunction with the method and system in accordance with the present invention. The data processing system 10 may define or be part of a larger database system. The data processing system 10 includes processor(s) 12 that may be part of a server system (not explicitly shown), a storage subsystem 14, local memory 16 that may be part of a server system, and clients 18, 20, and 22. The clients 18, 20, and 22 may be employed by users (not shown) to provide input to and receive output from the data processing system 10. The storage subsystem 14 is preferably used as long term storage for tables, table spaces and/or other database objects of the database system. The local memory 16 may be used by the processor(s) 12. Note that although not explicitly depicted, one or more of the components 12, 14, 16, 18, 20, and 22 may be coupled through a network, such as a LAN or the Internet.

Figure 2:
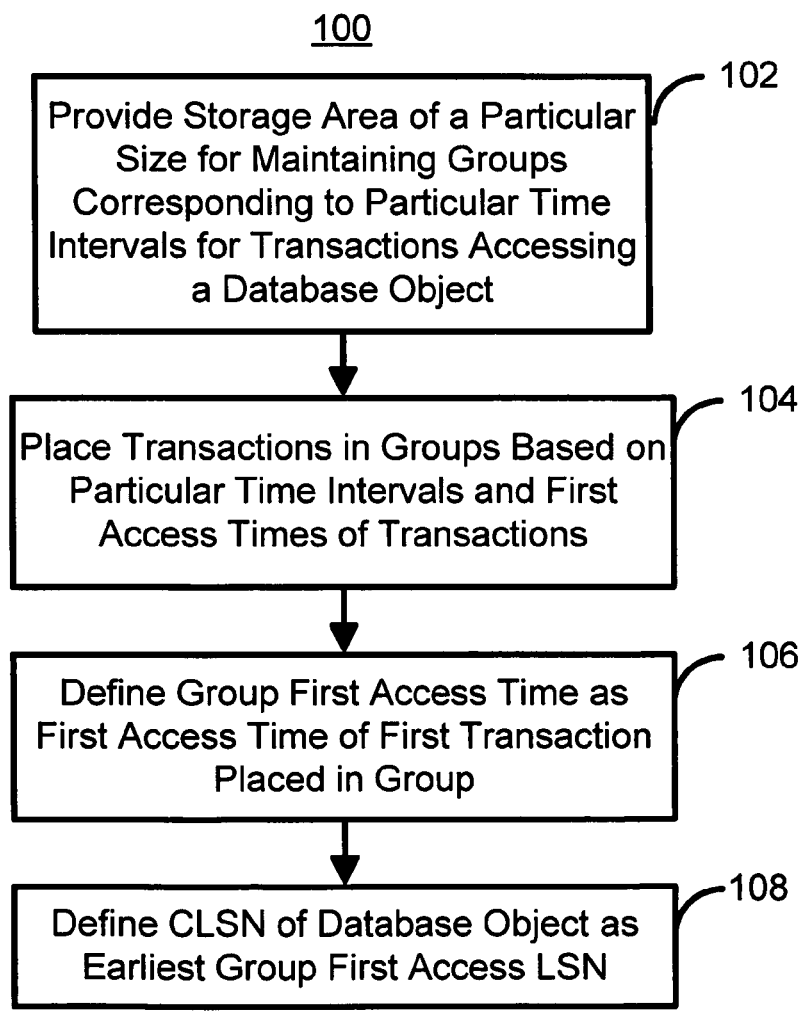
FIG. 2 is a flow chart of one embodiment of a method in accordance with the present invention for estimating the first access time of a transaction.

FIG. 2 is a flow chart of one embodiment of a method 100 in accordance with the present invention for estimating the first access time of a transaction in a database system. The method 100 is preferably performed using the data processing system 10. However, another system (not shown) might be used. A storage area of a particular size for each database object is provided, via step 102. Step 102 preferably includes providing control information, for example, a control block having a particular size in the memory 16. The storage area is used to store data for groups corresponding to a particular database object. The storage area is preferably allocated before any transaction accesses the database object and is preferably initialized by zeroing the group counts and the group LSNs, and by setting one of the groups to be the current group. Each of the groups corresponds to a particular time interval. This time interval may not be fixed. For example, in one embodiment, transactions are added to groups in a round-robin fashion as long as an empty group is available. In this embodiment, the time interval is variable in length and the number of groups is fixed. In another embodiment, a fixed number of transactions may be placed in each group. In this embodiment, the time interval and the number of groups might vary. In yet another embodiment, the time interval may be fixed, while the number of transactions in a group and the number of groups may vary. Other methods could also be used. Because each group corresponds to a particular time interval, each group corresponds to a particular range of LSN values. Also in a preferred embodiment, step 102 includes providing more than one group. For example, storage area for two groups might be defined in step 102. However, in another embodiment, another number of groups may be provided. In addition, the storage area may store information for multiple types of transactions. For example, if both the read and write CLSN values are tracked for a database object, some groups may track read accesses, while other groups write access. The present invention is described in the context of a particular type of transaction. However, other types of transactions could be tracked in an analogous manner. Moreover, step 102 is preferably performed for each database object that is accessed by transactions in the database system.

The method and system also include placing each transaction for a particular database object in a group corresponding to the database object based upon a time of a first access (first access time) of the database object by the transaction and the particular time interval of the group, via step 104. In a preferred embodiment, a current group is a group to which new transactions should be added. Any transaction first accessing the database object is placed in this current group in step 104. In a preferred embodiment, a first access corresponds to a claim being placed on the database object by the transaction. Thus, in one embodiment, the first access time is the time that the claim is placed. However, in another embodiment, the first access time could correspond to another analogous time, such as bumping an access count for the database object. Thus, through step 104, the transaction having a first access with an LSN value within the LSN values in the window of the group is placed within that group. In a preferred embodiment, step 104 is performed by adding information to a control block stored in the storage area defined in step 102. For example, the control block might indicate the number of transactions in each group, the current active group, the time interval or first access LSN values of the groups, or provide other information relating to the groups.

The first access time of the first transaction in the group is stored as the first access time of the group (group first access time), via step 106. Stated differently, the earliest first access time of the transactions in the group is defined to be the group first access time. In a preferred embodiment, the group first access time, or group first access LSN, is the minimum first access LSN of all the transactions in the group. The earliest group first access LSN, or minimum group first access LSN, is defined as the CLSN of the database object, via step 108. Thus, the CLSN of the object corresponds to the earliest first access time of oldest group that is still active.

Using the method 100, transactions may be placed into groups based on the current LSN values at the time of their first access of the database object. Each group corresponds to a particular range of LSN values. The first access LSN values of all the transactions in a group can, therefore, be conservatively approximated by using the first access LSN value of the first transaction in the group. In particular, every transaction within a group is considered to have the minimum first access LSN of all the transactions in the group. The group having the earliest group first access time, or minimum group first access LSN, can be considered to be the oldest group. This minimum group first access LSN can also be considered to be the CLSN of the database object. When all of the transactions in a group have committed or completed accessing the database object, or have released their claims on the database object (completed their de-claims), the group is empty. In a preferred embodiment, this group may later be reused. In addition, if the emptied group was the group, having the minimum group first access LSN value, then the CLSN value of the database object is updated to the new minimum first access LSN for an active group. As a result, the CLSN value can be maintained without becoming too stale. Furthermore, because the first access LSN values of individual transactions need not be tracked, the method 100 consumes fewer resources. Thus, the CLSN value may be maintained without adversely affecting performance of the database system.

Figure 3:
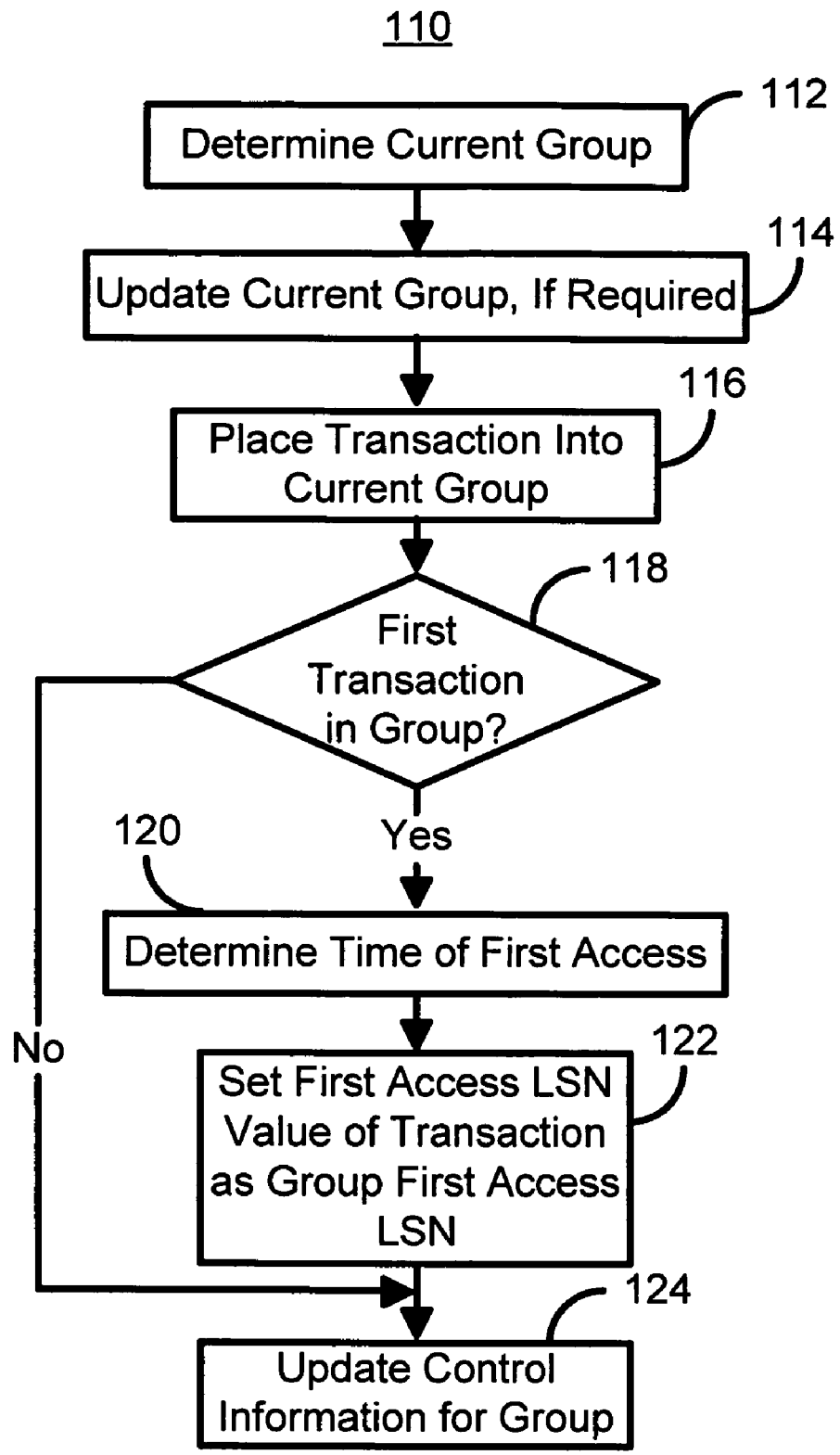
FIG. 3 is a flow chart of another embodiment of a method in accordance with the present invention for estimating the first access time of a transaction.

FIG. 3 is a flow chart of another embodiment of a method 110 in accordance with the present invention for estimating the first access time of a transaction. The method 110 is preferably performed using the data processing system 10. However, another system (not shown) might be used. The method 110 preferably commences in response to particular actions being taken by transactions, for example a request for a lock or a claim on a table or other database object. In addition, for ease of explanation, the steps in the method 110 are described as a flow of one step to another. However, one of ordinary skill in the art will readily recognize that one or more steps may be performed simultaneously in particular implementations.

Once a transaction attempts a first access to an object, either by requesting a lock or a claim or some other means, It must determine the current group. The current group is determined, via step 112. The current group is receiving new transactions. Step 112 determines whether a new group should be designated as the current group or whether the current group is to remain unchanged. For example, if transactions are assigned to groups in a round-robin fashion, step 112 would determine whether a next empty group is available. If such a group is available and the current group is not empty, then the next available group would be determined to be the current group. If it is determined in step 112 that a new group is the current group, then the current group is updated, via step 114. Stated differently, if a new group is to be the current group, then the identity of the current group is changed in step 114. The transaction is placed in the current group, which is currently active and receiving transactions, via step 116. Placing the transaction in the current group associates the transaction with the current group. In a preferred embodiment, this is accomplished by storing the identity of the group with the transaction. It is determined whether the transaction is the first transaction in the group, via step 118. If so, then the first access time for the transaction is determined, via step 120. In one embodiment, the first access time is the time that the transaction makes a claim on a database object. In a preferred embodiment, step 120 includes determining the current LSN value for the point of time at which a transaction first requests a table lock. However, in another embodiment, another analogous time such as the time an access count is incremented may be used as the first access time. In either embodiment, step 120 is only implemented for the first transaction in a group. The first access LSN value for this first transaction in the group is used to set the group first access LSN, via step 122. If the transaction is not the first member of the group, then the method skips to step 124, discussed below. Consequently, the earliest first access LSN value for the group is taken to be the first access LSN value of the first transaction put in the group. The first access LSN value for the group is thus the minimum first access LSN value for all transactions in the group. Control information for the group(s) is updated, via step 124. For example, the number of transactions in the group and the transactions corresponding to the group may be updated in step 124. In addition, the CLSN value for the database object may be updated in step 124, for example if the current group is the oldest group and the new transaction is the first member i.e. this is the first transaction being put into any group.

Using the method 110, transactions may be placed into groups based on the LSN values at the time of their first access of the database object. The first access LSN values of the transactions are tracked using the groups. All transactions are placed into groups based upon the time of their first access to a database object. Furthermore, only the minimum first access LSN value of all the transactions in the group is stored. This first access LSN value is the minimum first access LSN value for the transactions in the group. Consequently, the first access LSNs of all the remaining transactions in the group may be estimated conservatively by using this stored first access LSN value for the group. Furthermore, the CLSN of the database object may be defined as the minimum group first access LSN for all currently active groups.

Figure 4:
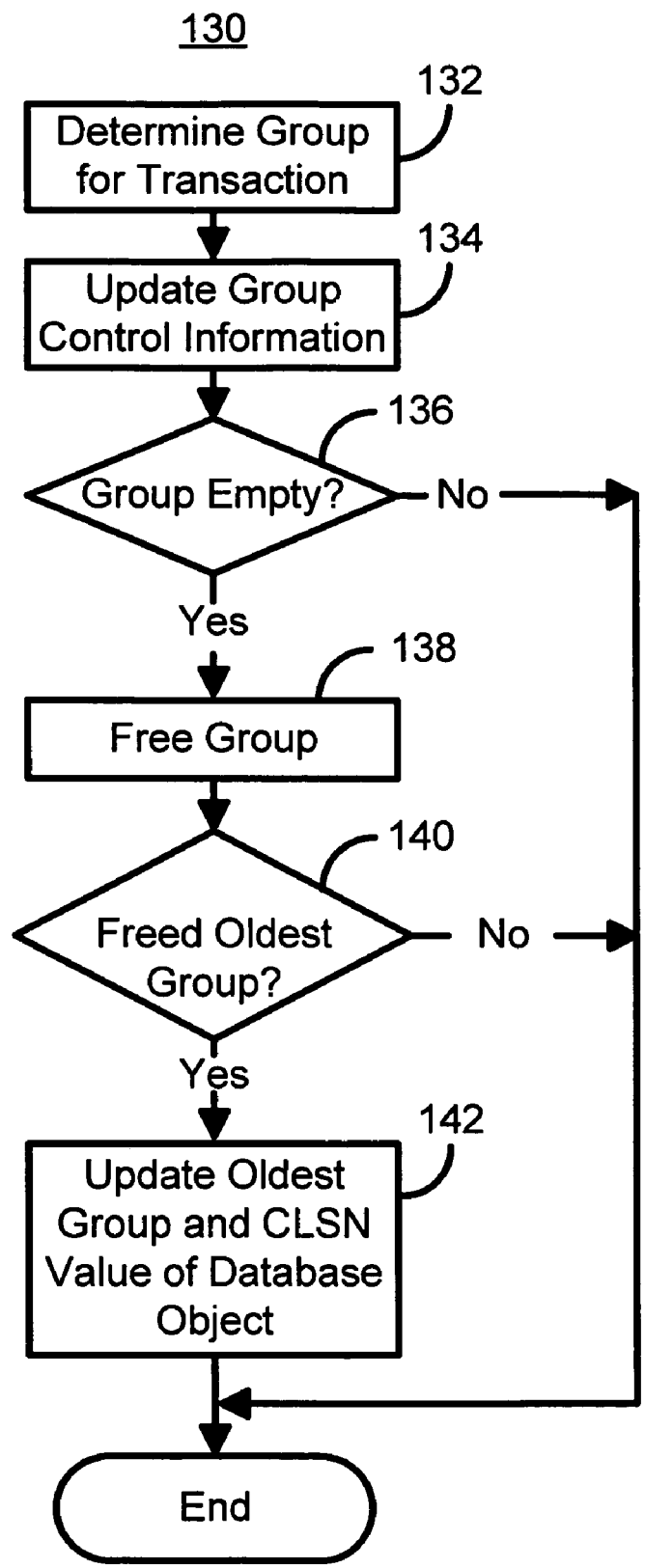
FIG. 4 is a flow chart of another embodiment of a method in accordance with the present invention for estimating the first access time of a transaction.

FIG. 4 depicts a flow chart of another embodiment of a method 130 in accordance with the present invention for estimating the first access time of all currently active transactions. The method 130 is preferably performed using the data processing system 10. However, another system (not shown) might be used. The method 130 preferably commences in response to particular actions being taken by transactions, for example a de-claim indicating that the transaction is finished accessing a database object. In addition, for ease of explanation, the steps in the method 130 are described as a flow of one step to another. However, one of ordinary skill in the art will readily recognize that one or more steps may be performed substantially simultaneously or in another order in particular implementations.

When a transaction is done accessing a database object, it performs a declaim operation on that database object. This declaim may consist of updating control information for the object, releasing locks, and other activities. At such a time, the transaction may also perform some operations to maintain the CLSN value for the database object that is being declaimed. When declaiming, the group corresponding to the transaction issuing the de-claim is determined, via step 132. Step 132 preferably utilizes information relating to the identity of the group that is stored in the transaction, for example in step 116 of the method 110. The control information for this group corresponding to the transaction is updated, via step 134. Step 134 may include reducing the number of transactions in this group. It is determined whether this group is empty, via step 136. If not, the method 130 is complete. If the group does become empty, then the group may be freed to become the current group at a later time, via step 138. It is determined if the freed group was the oldest group, via step 140. If not, method 130 is complete. If the group is empty and the oldest group, then the oldest group and CLSN value for the database object are updated, via step 142. The group having the next oldest first access LSN value and which is not empty becomes the oldest used group in step 142. In addition, this new oldest group's first access LSN value is set as the CLSN value for the database object in step 142. In a preferred embodiment, step 142 also includes setting the freed group as the next active group. If there is no other used group, then the CLSN value for the database object may be set to the current system LSN value, or to some other value to indicate that no transactions are currently accessing the object.

Using the methods 110 and 130, transactions may be placed into groups based on the LSN values at the time of their first access of the database object. The approximate first access LSN values of the transactions are tracked using the groups. All transactions, on first accessing the database object and on issuing de-claims for the database object may be tracked. Moreover, such tracking in the methods 110 and 130 may be performed using a latch or atomic instructions. The database object's CLSN value is considered to be the minimum group first access LSN value of all the active groups. As a result, the CLSN value can be maintained without becoming too stale. Furthermore, because the first access LSN values and transaction information of individual transactions need not be tracked, the methods 110 and 130 consume fewer resources. Thus, the CLSN value may be maintained without adversely affecting performance of the database system.

Figure 5A:
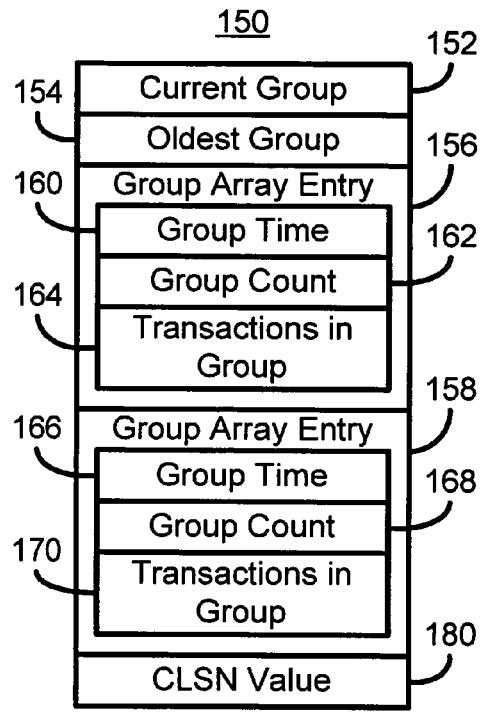
FIGS. 5A-5D are diagrams depicting one embodiment of a control block in accordance with the present invention.

FIG. 5A is a diagram depicting a one embodiment of a control block 150 in the storage area in accordance with the present invention. The control block 150 preferably resides in the memory 16 of the system 10 described in FIG. 1. Referring back to FIG. 5A, the control block 150 may be used for a particular database object as well as for particular types of transactions. For example, the control block 150 might be used only for write transactions or only for read transactions.

The control block 150 includes an identifier of the current group 152, an identifier of the oldest group 154, and an array of structures for each group 156 and 158. In the example shown, two array entries 156 and 158 are depicted because two groups are used. However, in another embodiment, another number of groups and, therefore, another number of array entries may be provided. Each group array entry 156 and 158 includes the group first access time 160 and 166, respectively, and the count of transactions in the group 162 and 168, respectively. The group that a particular transaction claimed into is stored in information kept by the transaction. Consequently, the identities of transactions in a group are preferably not stored in the control block for the group. However, for ease of explanation, the transaction in the group are also listed in blocks 164 and 170 and described below.

Using the method 100 and/or 110 and 130, the control block 150 may be defined and updated. For example, suppose two groups—group 0 and group 1 having group arrays 156 and 158, respectively, are used. Group 0 includes transactions TR1, TR2, TR3, TR4 and TR5. Transactions TR1, TR2, TR3, TR4, and TR5 have LSN values for the first access of LSN1, LSN2, LSN3, LSN4, and LSN5 (in ascending order of time), respectively. However, Group 0 stores only LSN1 for the first transaction TR1. Group 1 includes transactions TR6, TR7, TR8, and TR9. Transactions TR6, TR7, TR8, and TR9 have LSN values for the first access of LSN6, LSN7, LSN8, and LSN9, respectively (again, in ascending order of time). Group 1 stores only LSN6 for the first transaction TR6. In addition, assume that Group 1 is the current group to which new transactions are added. Also assume that a new transaction TR10 having a first access LSN value of LSN 10 for the first access is received. Using the method 110, TR10 is placed into the active Group 1. Because it is not the first member of Group 1, the first access LSN value for the group is not updated. Instead, the first access LSN value for Group 1 remains LSN6.

Figure 5B:
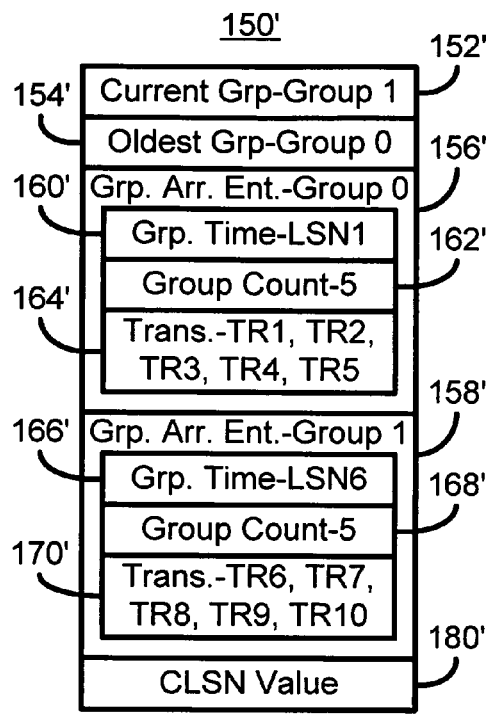

FIG. 5B depicts the control block 150' for the example described above. Thus, the current group 152' is Group 1, while the oldest group 154' is Group 0. The CLSN for the object 180' is LSN1, the first access LSN value for Group 0 (the minimum first access LSN value for any member of Group 0). The group array entry 156' for Group 0 includes the group first access time 160' LSN1, the group count 162' of five and, in the embodiment shown, the transactions 164' TR1, TR2, TR3, TR4, and TR5. The group array entry 158' for Group 1 includes the group first access time 166' LSN6, the group count 168' of five and, in the embodiment shown, the transactions 170' TR6, TR7, TR8, TR9, and TR10.

Figure 5C:
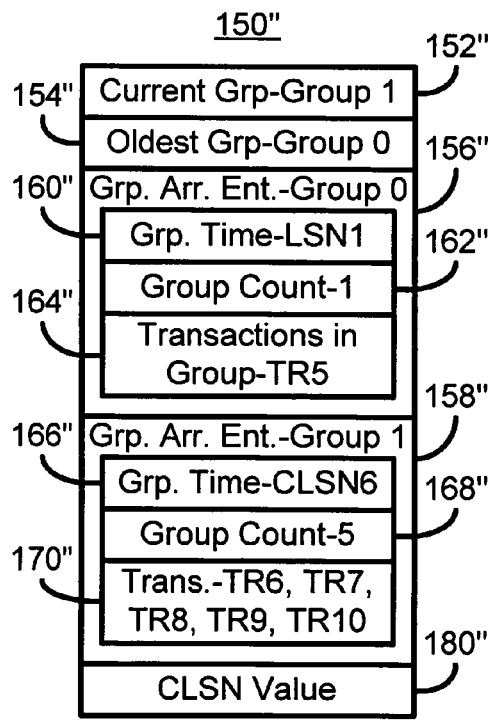

In addition, the CLSN value of the database object may be updated and the groups managed. For example, assume that transactions TR1, TR2, TR3, and TR4 have already issued de-claims and been accounted for. Group 0 would thus include only one transaction, TR5. FIG. 5C depicts the control block 150", for this case. Thus, the current group 152" is still Group 1, while the oldest group 154" is still Group 0. The CLSN value for the object 180" is still LSN1 because the oldest group is still Group 0. The group array 156" for Group 0 includes the group first access time 160" LSN1, the group count 162" of one and, in the embodiment shown, the transactions 164" TR5. The group array 158" for Group 1 includes the group first access time 166" LSN6, the group count 182" of five and, in the embodiment shown, the transactions 170" TR6, TR7, TR8, TR9, and TR10.

Figure 5D:
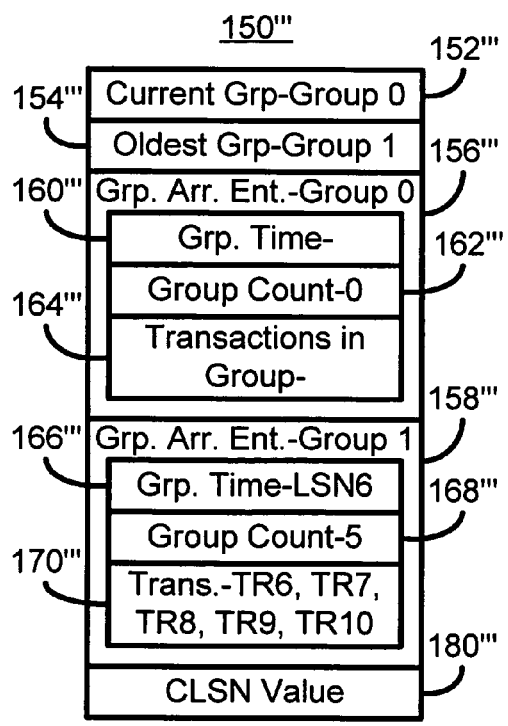

Suppose that transaction TR5 issues a de-claim. Using the method 130, the control block 150" may be updated to account for this. In addition, it may be assumed that Group 0 becomes the current group as it is now available to receive new transactions. Note that although in this example, Group 0 has been identified as the current group, this update of the current group is preferably accomplished at claim time in the method 110. FIG. 5D depicts the control block 150''', for this case. Thus, the current group 152''' is now Group 0, while the oldest group 154''' has been updated to Group 1. The CLSN value for the object 180' is now LSN6 because LSN6 is the minimum first access LSN value of all the used/active groups. The group array entry 156' for Group 0 does not have a specified group time 160''' yet. The group count 162''' is zero and, in the embodiment shown, the transactions 164''' is also empty. The group array entry 158''' for Group 1 includes the group first access time 166''' LSN6, the group count 182''' of five and, in the embodiment shown, the transactions 170''' TR6, TR7, TR8, TR9, and TR10.

In this example, a transaction making a first access request for the database object will be placed in Group 0. The control block 150''' will be updated. Using the methods 100 and/or 110 and 130, the control blocks 150/150'/150"/150''' may be updated. Thus, the CLSN values of the object may be maintained through the use of First Access LSN values corresponding to the groups. As a result, the minimum first access times of all transactions accessing particular database objects may be estimated and used for various processes in the database system. Consequently, performance of the database system may be improved.

A method and system for estimating a minimum, or earliest, first access time of all currently active transactions accessing a database object is described. The present invention has been described in accordance with the embodiments shown, and one of ordinary skill in the art will readily recognize that there could be variations to the embodiments, and any variations would be within the spirit and scope of the present invention.

The invention can take the form of an entirely hardware embodiment, an entirely software embodiment, or an embodiment containing both hardware and software elements. In one aspect, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For purposes of this description, a computer-usable or computer-readable medium can be any apparatus that can contain, store, communicate, or transport the program for use by or in connection with the instruction execution system, apparatus, or device. The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-RW)

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Accordingly, many modifications may be made by one of ordinary skill in the art without departing from the spirit and scope of the appended claims.

We claim:

1. A computer implemented method for estimating an earliest first access time of a plurality of currently active transactions accessing at least one database object, wherein the computer performs the following functions comprising:
   providing a storage area of a particular size to store data for a plurality of groups corresponding to the at least one database object;
   placing each of the plurality of currently active transactions accessing the object in a group of the plurality of groups, the plurality of groups corresponding to a plurality of time intervals, and a particular range of logic sequence numbers, each of the plurality of currently active transactions accessing the at least one database object being placed in the group based upon a first access time of the at least one database object by each of the plurality of currently active transactions and the particular time interval wherein the first access time is represented by a log sequence number;
   storing a group first access time for the group by adding information about the first group in a control block in the storage area, the group first access time corresponding to the earliest first access time for any of the plurality of currently active transactions in the group; and defining the earliest first access time for any of the plurality of currently active transactions in the group as a commit log sequence number.

2. The method of claim 1 wherein the first access time further includes a claim time for each of the plurality of currently active transactions.

3. The method of claim 2 wherein the first access time corresponds to acquiring a lock for a database object.

4. The method of claim 1 wherein accessing further includes:
   accessing a database object for at least one of a read access and a write access.

5. The method of claim 1 further comprising:
   defining an earliest group first access time for the plurality of groups as an object first access time of the at least one database object.

6. The method of claim 5 further comprising:
   updating the identity of the group of the plurality of groups having the earliest group access time to a group having a next earliest group first access time in response to the group having the earliest group first access time becoming empty.

7. The method of claim 1 further comprising:
   removing a transaction of the plurality of currently active transactions from a corresponding group of the plurality of groups in response to the transaction issuing a de-claim for the at least one database object.

8. The method of claim 1 wherein the information in the control block indicates the number of transactions in each group, the current active group, a time interval and first access values of each group.

9. A system for estimating an earliest first access time of a plurality of currently active transactions accessing at least one database object, the system comprising:
   means for providing a storage area of a particular size to store data for a plurality of groups corresponding to the at least one database object;
   means for placing each of the plurality of currently active transactions accessing the object in a group of the plurality of groups, the plurality of groups corresponding to a plurality of time intervals, and a particular range of logic sequence numbers, each of the plurality of currently active transactions accessing the at least one database object being placed in the group based upon a first access time of the at least one database object by each of the plurality of currently active transactions and the particular time interval wherein the first access time is represented by a log sequence number;
   means for storing a group first access time for the group by adding information about the first group in a control block in the storage area, the group first access time corresponding to the earliest first access time for any of the plurality of currently active transactions in the group; and
   means for defining the earliest first access time for any of the plurality of currently active transactions in the group as a commit log sequence number.

10. The system of claim 9 wherein the first access time further includes a claim time for each of the plurality of currently active transactions.

11. The system of claim 10 wherein the first access corresponds to acquiring a lock for a database object.

12. The system of claim 9 wherein accessing means further includes:
   means for accessing a database object for at least one of a read access and a write access.

13. The system of claim 9 further comprising:
   means for defining an earliest group first access time for the plurality of groups as an object first access time of the at least one database object.

14. The system of claim 13 further comprising:
   means for updating the identity of the group of the plurality of groups having the earliest group access time to a group having a next earliest group first access time in response to the group having the earliest group first access time becoming empty.

15. The system of claim 9 further comprising:

means for removing a transaction of the plurality of currently active transactions from a corresponding group of the plurality of groups in response to the transaction issuing a de-claim for the at least one database object.

16. The system of claim 9 wherein the information in the control block indicates the number of transactions in each group, the current active group, a time interval and first access values of each group.

17. A computer readable medium containing program instructions for estimating an earliest first access time of a plurality of currently active transactions accessing at least one database object, the program instructions executable on a processing system, the program instructions comprising:

providing a storage area of a particular size to store data for a plurality of groups corresponding to the at least one database object;

placing each of the plurality of currently active transactions accessing the object in a group of the plurality of groups, the plurality of groups corresponding to a plurality of time intervals, and a particular range of logic sequence numbers, each of the plurality of currently active transactions accessing the at least one database object being placed in the group based upon a first access time of the at least one database object by each of the plurality of currently active transactions and the particular time interval wherein the first access time is represented by a log sequence number;

storing a group first access time for the group by adding information about the first group in a control block in the storage area, the group first access time corresponding to the earliest first access time for any of the plurality of currently active transactions in the group; and defining the earliest first access time for any of the plurality of currently active transactions in the group as a commit log sequence number.

18. The computer readable medium of claim 17 wherein the first access time further includes a claim time for each of the plurality of currently active transactions.

19. The computer readable medium of claim 18 wherein the first access corresponds to acquiring a lock for a database object.

20. The computer readable medium of claim 17 wherein accessing further includes:

accessing a database object for at least one of a read access and a write access.

21. The computer readable medium of claim 17 further comprising:

defining an earliest group first access time for the plurality of groups as an object first access time of the at least one database object.

22. The computer readable medium of claim 21 further comprising:

updating the identity of the group of the plurality of groups having the earliest group access time to a group having a next earliest group first access time in response to the group having the earliest group first access time becoming empty.

23. The computer readable medium of claim 17 further comprising:

removing a transaction of the plurality of currently active transactions from a corresponding group of the plurality of groups in response to the transaction issuing a de-claim for the at least one database object.

24. The computer readable medium of claim 17 wherein the information in the control block indicates the number of transactions in each group, the current active group, a time interval and first access values of each group.

* * * * *